United States Patent
Maitre

(10) Patent No.: US 9,428,158 B2
(45) Date of Patent: Aug. 30, 2016

(54) DEVICE FOR LOCKING AN AUTOMATIC GEARBOX OF A MOTOR VEHICLE IN THE PARK POSITION

(75) Inventor: Sebastien Maitre, Monistrol sur Loire (FR)

(73) Assignee: Dura Automotive Systems SAS, Bievres (FR)

( * ) Notice: Subject to any disclaimer, the term of this patent is extended or adjusted under 35 U.S.C. 154(b) by 40 days.

(21) Appl. No.: 14/234,302

(22) PCT Filed: Jul. 20, 2012

(86) PCT No.: PCT/FR2012/051728
§ 371 (c)(1),
(2), (4) Date: Mar. 5, 2014

(87) PCT Pub. No.: WO2013/014377
PCT Pub. Date: Jan. 31, 2013

(65) Prior Publication Data
US 2014/0197005 A1 Jul. 17, 2014

(30) Foreign Application Priority Data
Jul. 22, 2011 (FR) ...................................... 11 56677

(51) Int. Cl.
| | | |
|---|---|---|
| *B60T 1/00* | (2006.01) | |
| *F16H 63/34* | (2006.01) | |
| *B60T 1/12* | (2006.01) | |
| *B60T 1/06* | (2006.01) | |

(52) U.S. Cl.
CPC .................. *B60T 1/12* (2013.01); *B60T 1/005* (2013.01); *B60T 1/062* (2013.01); *F16H 63/3416* (2013.01)

(58) Field of Classification Search
CPC ........ B60T 1/00; B60T 1/12; F16H 63/3416; F16H 63/3425
USPC ......................................................... 192/219.4
See application file for complete search history.

(56) References Cited

U.S. PATENT DOCUMENTS

| | | | | | |
|---|---|---|---|---|---|
| 2,839,941 | A | * | 6/1958 | Rugen | ............................. 74/359 |
| 2,974,752 | A | * | 3/1961 | Howard | ...................... 192/219.4 |
| 5,893,439 | A | | 4/1999 | Park | |

(Continued)

FOREIGN PATENT DOCUMENTS

| | | | |
|---|---|---|---|
| FR | 2910416 A1 | 6/2008 | |
| JP | 2011084187 A | 4/2011 | |
| WO | 2009094969 | * 8/2009 | ............. F16H 63/48 |

OTHER PUBLICATIONS

Definition of "interoperability", retrieved from www.merriam-webster/dictionary/interoperability on Jan. 12, 2015.*

(Continued)

*Primary Examiner* — Robert Hodge
*Assistant Examiner* — Stacey Fluhart
(74) *Attorney, Agent, or Firm* — St Onge Steward Johnson and Reens LLC

(57) ABSTRACT

A carriage acted-on by a control system controlled by a part of the gearbox, so as to be moved sideways in relation to a locking rod able to interoperate with a toothed crown built into the said gearbox, with the said carriage being coupled to means operated by an actuator so as to be moved, if necessary, into a fixed position of the control system, characterized by the fact that the means consist of two superimposed compact levers and mounted so as to pivot on an axis against a torsion spring, with one of the levers being coupled to the carriage while the other lever is coupled to the control system.

16 Claims, 5 Drawing Sheets

(56) References Cited

U.S. PATENT DOCUMENTS 6,125,983 A * 10/2000 Reed et al. ................ 192/219.5
6,273,232 B1    8/2001 Kimura et al.
8,161,837 B2 *  4/2012 Giefer et al. .............. 74/473.26

OTHER PUBLICATIONS

International Search Report Application No. PCT/FR2012/051728 Completed: Oct. 5, 2012; Mailing Date: Oct. 17, 2012 3 pages.

* cited by examiner

DEVICE FOR LOCKING AN AUTOMATIC GEARBOX OF A MOTOR VEHICLE IN THE PARK POSITION

FIELD OF THE INVENTION

The invention pertains to the technical domain of gearboxes for motor vehicles, and more-particularly concerns automatic gearboxes.

BACKGROUND OF THE INVENTION

In the description below, the term "automatic gearbox" should be taken in the broad sense, as it can cover all kinds of gearboxes, notably robotized gearboxes with single or double clutch.

It should be borne in mind that this type of box can operate either in automatic mode, with the gears being changed automatically at an appropriate moment, or in manual mode, with the gears being changed by the driver via buttons, levers, etc. In automatic mode, the lever or other control systems can generally have different positions, namely a P (Park) position, R (Reverse) position, N (Neutral) position, D (Drive) position and, possibly, S (Sport) position.

Regardless of the type of automatic gearbox, the latter must incorporate a locking system when the vehicle is in (P) position. Generally, this locking system is implemented by a rod able to interoperate with a toothed wheel built-into part of the gearbox. This rod can be operated by a carriage that has, at one end, superimposed rollers, of which one interoperates with a cam profile on the rod that can interoperate with a toothed wheel built into a part of the gearbox. The other end of the carriage is coupled to a rod mounted in association with a spring that can be controlled by a linear sideways movement. The purpose of this rod is to take-up the non-movement that can result, in the P position of the gearbox control device, from non-engagement of the finger into a notch in the toothed wheel. This linear slide system—which can absorb, or not absorb, this difference in movement resulting from the positioning of the finger in relation to a notch (gearbox locking) or not (non-locking of the gearbox)—is fairly bulky.

SUMMARY OF THE INVENTION

The invention is intended to remedy these disadvantages in a simple, safe, effective and rational manner.

The problem that the invention is intended to resolve is to be able to lock the automatic gearbox, notably in the P position, by means of a compact device of small dimensions that is particularly reliable in operation.

To resolve such a problem, a device for locking a motor vehicle automatic gearbox in Park position has been designed and developed, incorporating a carriage acted-on by a control system controlled by a part of the gearbox, so as to be moved sideways in relation to a locking rod able to interoperate with a toothed crown built into the said gearbox, with the said carriage being coupled to means actuated by an actuator so as to be moved, if necessary, into a fixed position of the control system. Therefore, the purpose of the invention is to replace the system with a linear slide with an angular system.

According to the invention, the means consists of two compact superimposed levers mounted so as to pivot in relation to one axis against a spring, with one of the levers being coupled to a carriage, while the other lever is coupled to the control system.

According to other characteristics, the spring is mounted on the pivot pin between the two levers to enable a simultaneous angular movement of the said levers, or of one of the levers in relation to the other lever in travel limitation position.

The control system lever has an indexing finger able to interoperate—according to a selected position of the control system—with complementary shapes in a mounting plate in which the said control system lever and the carriage lever are mounted with pivoting capability.

The carriage lever interoperates with a locking pin operated by the actuator.

The result of these characteristics is, therefore, that the movement of the locking rod to absorb, or not absorb, the difference of movement is no longer the result, as in past art, of a linear slide system but, according to the invention, is the result of a controlled-rotation system that can be significantly smaller in size.

Significantly, the device according to the invention is capable of taking account of the possible positions of the control system, which are neutral point, fourth and reverse gear.

The result is the following functional technical characteristics:

when the set of control system and carriage levers is positioned in the neutral point position, the control system is in neutral point/fourth/reverse gear position, and the actuator is not powered, a clearance of a few millimeters occurs between the locking pin and the carriage lever;

when the set of control system and carriage levers is in fourth position, the control system is in fourth position, the control system is in fourth position and the actuator is not powered, the carriage withdraws in relation to the locking rod, with the carriage lever being driven angularly directly be the control system lever, via the spring, with the said levers being indexed in fourth position in the mounting plate;

when the set of control system and carriage levers is in reverse gear position, the control system is in reverse gear position and the actuator is not powered, the carriage lever is blocked by the locking pin, while the control system lever is moved angularly against the spring, to be indexed in reverse gear position in the plate;

when the set of control system and carriage levers is in P position, the locking rod is not engaged in a notch of the toothed wheel, the control system is in reverse gear position and the actuator is powered, the spring absorbs the relative movement between the control system lever indexed in reverse gear position in the plate, and the carriage lever bears against the locking pin moved by the said actuator;

when the set of control system and carriage levers is engaged in the P position, the locking rod is engaged in a notch of the toothed crown, the control system is in the reverse gear position, and the actuator is powered, the control system lever is indexed in the reverse gear position in the plate, and the carriage is brought forward onto the locking rod under the effect of movement of the carriage lever bearing against the locking rod when the power to the actuator stops.

According to another characteristic, to resolve the problem posed of unlocking the device under extreme conditions, the carriage lever has a shoulder protruding from its base, engaged in an opening in the control system lever, to create a direct-contact area.

BRIEF DESCRIPTION OF THE DRAWINGS

The invention will be explained below in more detail, with the aid of the appended drawings, in which.

DETAILED DESCRIPTION OF THE INVENTION

Figure 1:
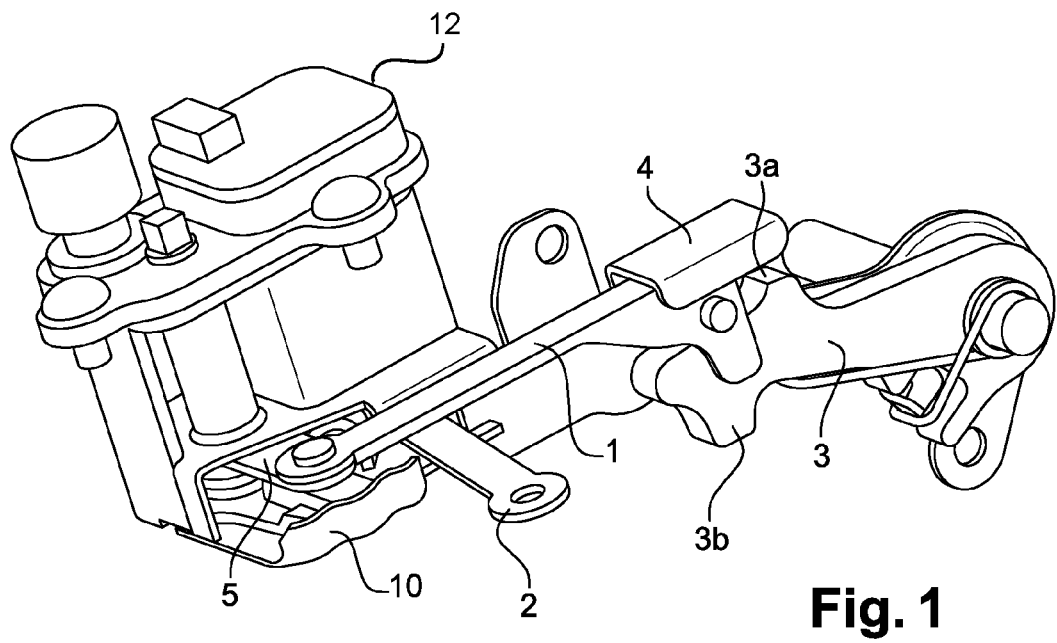
FIG. 1 is a view in perspective of the locking system according to the invention.
Figure 2:
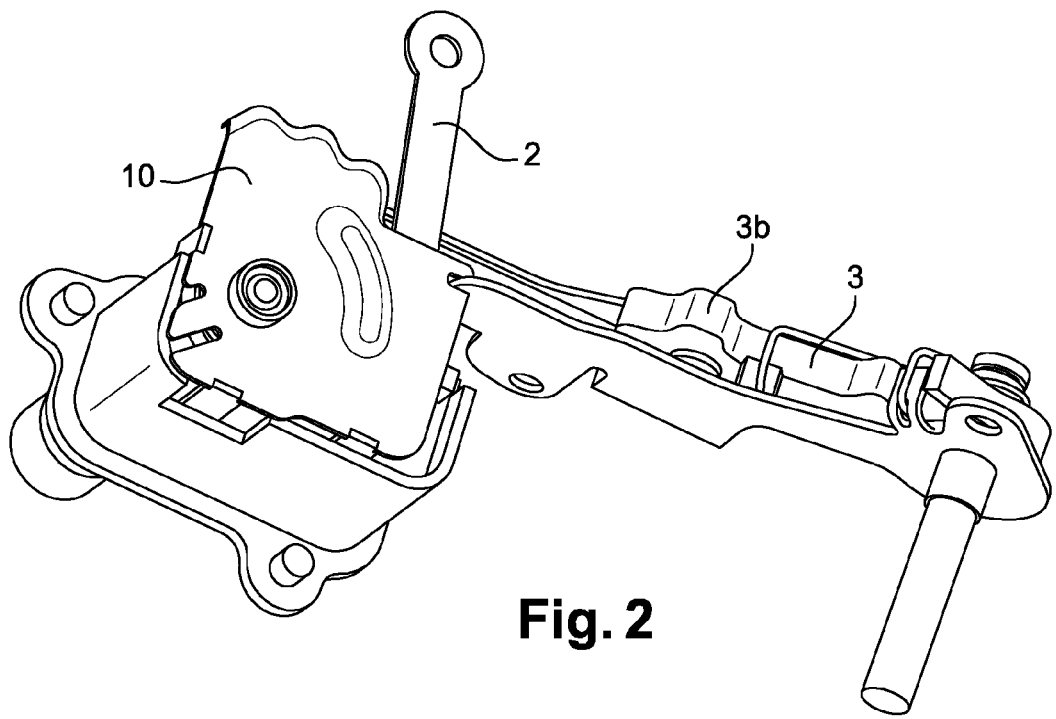
FIG. 2 is a view in perspective corresponding to FIG. 1, viewed from below the lever set, control system and carriage mounted on a pivot pin in association with a torsion spring.
Figure 3:
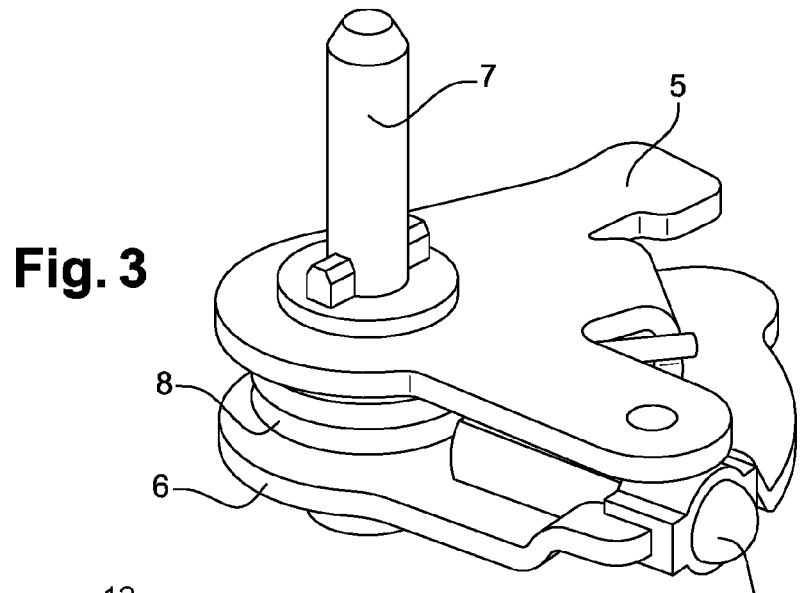
FIG. 3 is a view in perspective of the lever set.

As shown, the locking system with the automatic gearbox in P (Park) position includes, in accordance with known art, a carriage (1) acted-on by a control system (2) controlled by a part of the gearbox, so as to be moved sideways as will be explained further on in the description, in relation to a locking rod (3). One of the ends of the carriage (1) has rollers, of which one interoperates with a cam profile (3a) of the rod and the other interoperates with a flat rolling track (4) incorporated in part of the gearbox.

In accordance with known art, the rod has a boss (3b) designed to interoperate with a toothed wheel incorporated in part of the gearbox. When the boss (3b) is engaged in one of the notches of the toothed wheel, the gearbox is disabled.

According to the invention, the carriage (1) control to absorb the non-movement when the boss of the finger is not interoperating with a notch is implemented by a set of two levers (5) and (6) of compact geometric form. The lever (5) is the carriage lever, while lever (6) is the control system lever. The said levers (5) and (6) are mounted so as to pivot in relation to one axis (7) against a torsion spring (8). The carriage lever (5) is coupled at its free end from the carriage (1) as opposed to its end interoperating with the rod (3). The control system lever (6) is coupled—by a conrod (2), for example—to a control system controlled by the gearbox.

The spring (8) is mounted on the pivot pin (7), between the two levers (5) and (6), to enable a simultaneous angular movement of the said levers, or to enable a movement of one of the levers in relation to the other, in travel limitation position, such as will be explained further on in the description. The control system lever (6) has an indexing finger (9) able to interoperate—according to a selected positions of the control system—with complementary shapes (10a) in a mounting plate (10) in which the levers (5) and (6) are mounted with pivoting capability. The carriage lever (5) interoperates with a locking pin (11) operated, for example, by an actuator (12) acted-on by the gearbox control device.

The control system provides angular drive to the set of levers (5) and (6) via the conrod (2), under the effect of operation of the actuator (12), so as to drive the carriage (1), on the cam profile (3a) of the rod (3) to engage the boss (3b) in a notch in the toothed wheel corresponding to the locking. As stated, the device is maintained in neutral point, fourth and reverse gear position by the indexing finger (9), notwithstanding the contrary force applied by the torsion spring (8). The indexing provides drive after around 60% of the travel of the control system.

A clearance of more or less two millimeters is enforced at the link between the conrod and the control system lever (6), in the direction of movement of the said lever, in order to ensure the absence of undesired forces on the control system.

Note that manual unlocking of the device can be performed by all known means that can be installed to be controlled from the vehicle's passenger compartment.

The device according to the invention is capable of operating according to the possible positions of the control system, namely neutral point, fourth and reverse gear. Refer to FIGS. 4 to 11.

Figure 4:
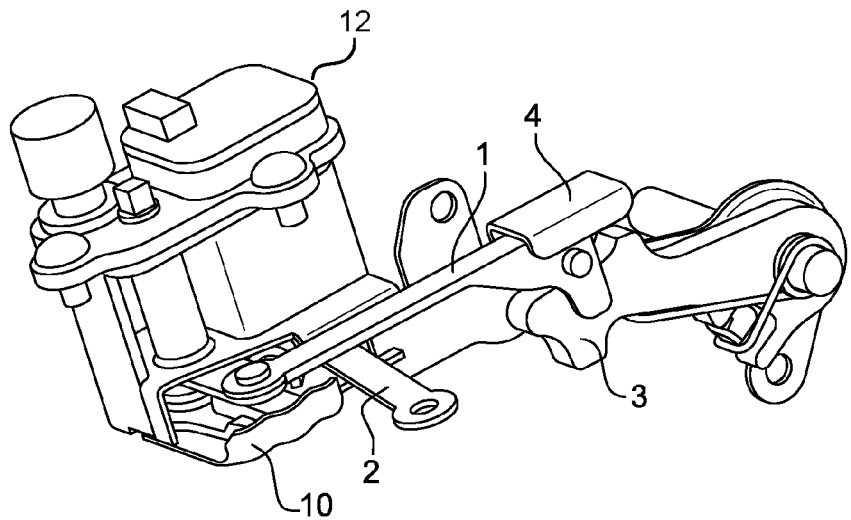
FIG. 4 is a view in perspective of the device with the lever in neutral point position and the control system in neutral point, fourth and reverse gear position.
Figure 5:
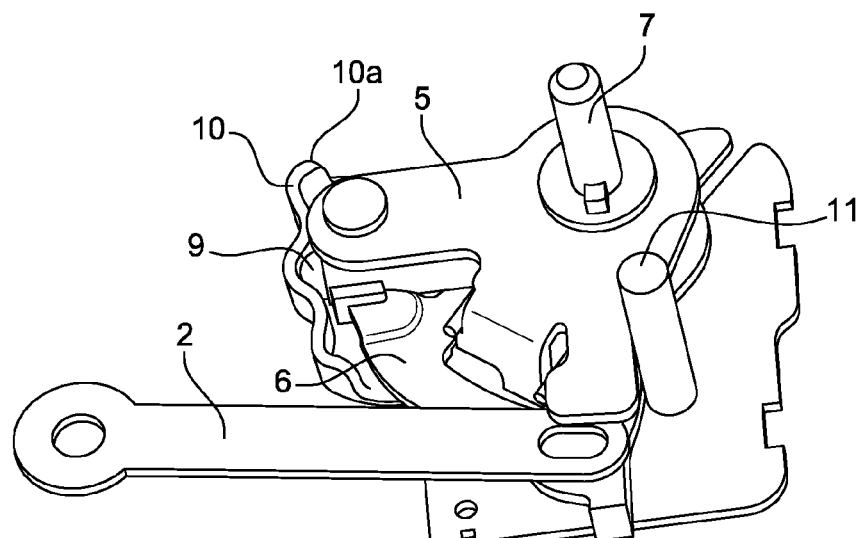
FIG. 5 is a view in perspective showing the position of the carriage lever and control system lever such as illustrated in FIG. 4.

In FIGS. 4 and 5, the levers (5) and (6) are in neutral point position, with the control system being in neutral point, fourth and reverse gear position. Because the actuator (12) is not powered, a clearance of a few millimeters—around 1 mm —occurs between the locking pin (11) and a part of the carriage lever (5).

Figure 6:
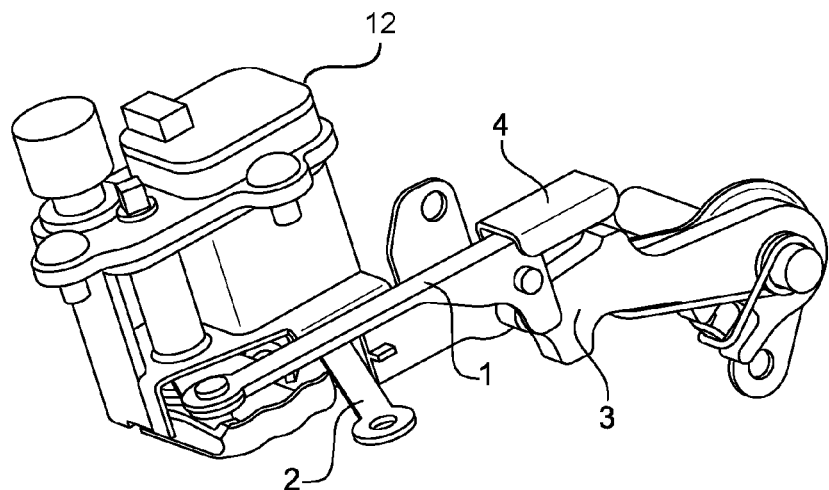
FIG. 6 is a view in perspective of the device, with the lever set and the control system in fourth position.
Figure 7:
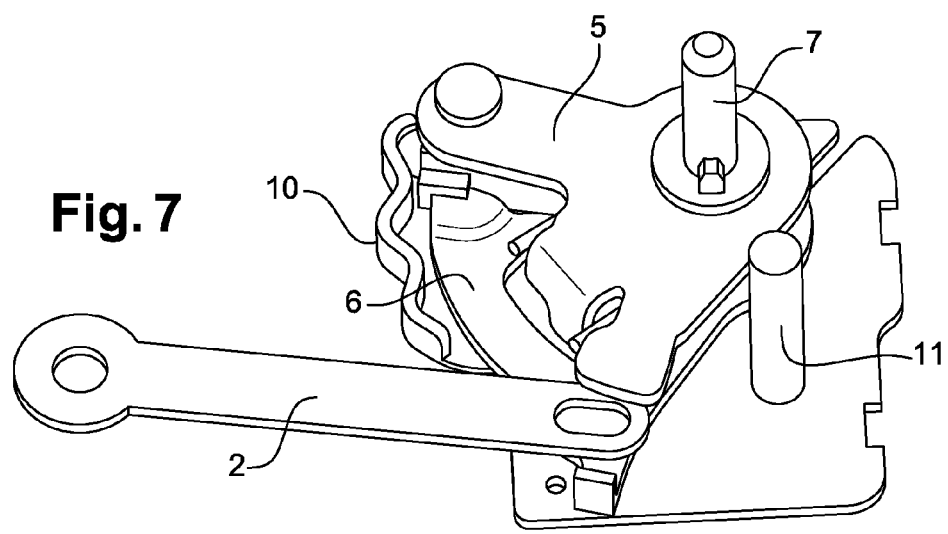
FIG. 7 is a view in perspective showing the position of the levers according to the position of the control system, such as illustrated in FIG. 6.

In FIGS. 6 and 7, the levers (5) and (6) and the control system are in fourth position; the actuator (12) is not powered. In this case, and as is illustrated in FIG. 6, the carriage (1) is withdrawn on the locking rod (3) track (3a). The carriage lever (5) is driven directly by the control system lever (6). The control system lever (6) in indexed in fourth position by means of the finger (9). Consequently, the same applies for the carriage lever (5); see FIG. 7.

Figure 8:
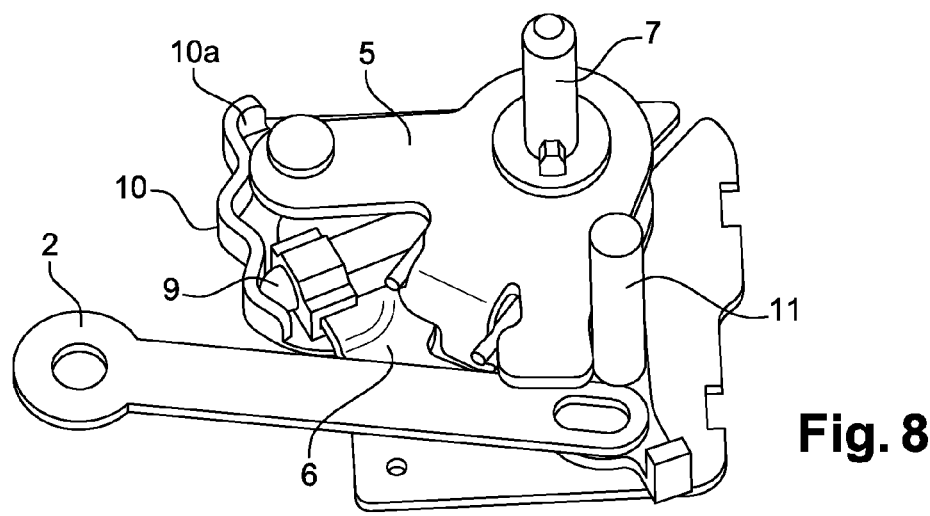
FIG. 8 is a view in perspective showing the positioning of the levers, with the set of levers being in the reverse gear position and the control system also in reverse gear position.

In FIG. 8, the levers (5) and (6) and the control system are in reverse gear position. The actuator (12) is not powered, so the carriage (1) is blocked by the locking pin (11). The spring (8) absorbs the relative movements between the control system lever (6) and the carriage lever (5). The levers (5) and (6) are indexed in reverse gear position by the finger (9) in the plate (10).

Figure 9:
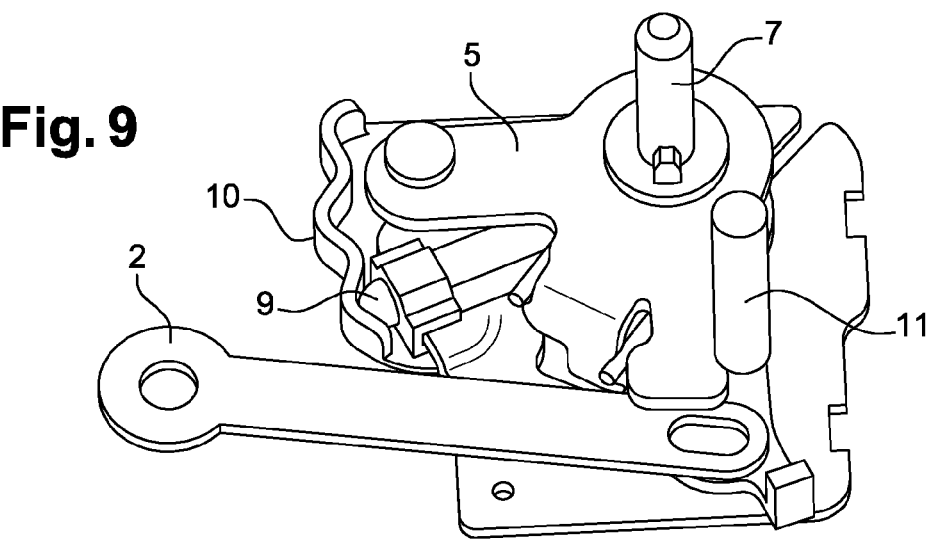
FIG. 9 is a view in perspective of the device when the set of levers is in P position and the finger is not engaged in a notch of the toothed wheel, while the control system is in the reverse gear position.

In FIG. 9, the device is shown when the rod (3) is not engaged in a notch of the toothed wheel. The levers (5) and (6) are in the P position. The control system is in the reverse gear position. When the actuator (12) is powered, the control system lever (9) is always indexed in the reverse gear position. The spring (8) absorbs the relative movements between the control system lever (6) and the carriage lever (5), as previously stated. In this case, the locking pin (11), which is controlled by the actuator (12), bears against the carriage lever (5).

Figure 10:
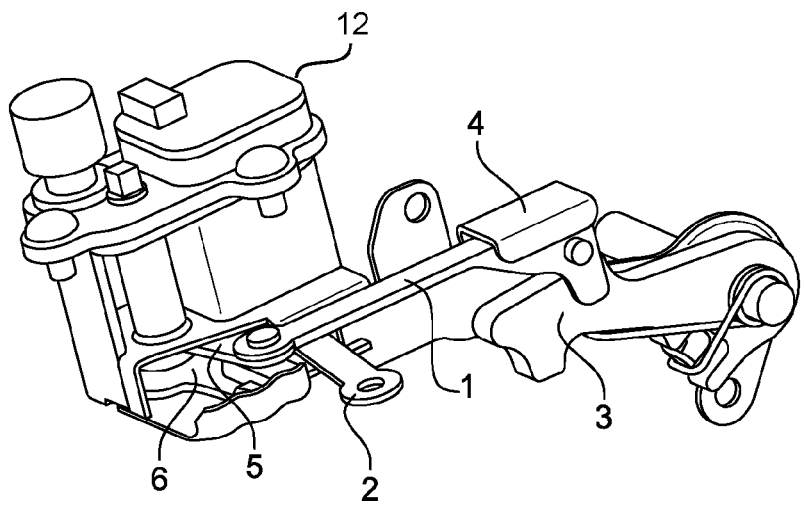
FIG. 10 is a view in perspective of the device when the set of levers is in P position and the finger is engaged in a notch of the toothed wheel, while the control system is in the reverse gear position.
Figure 11:
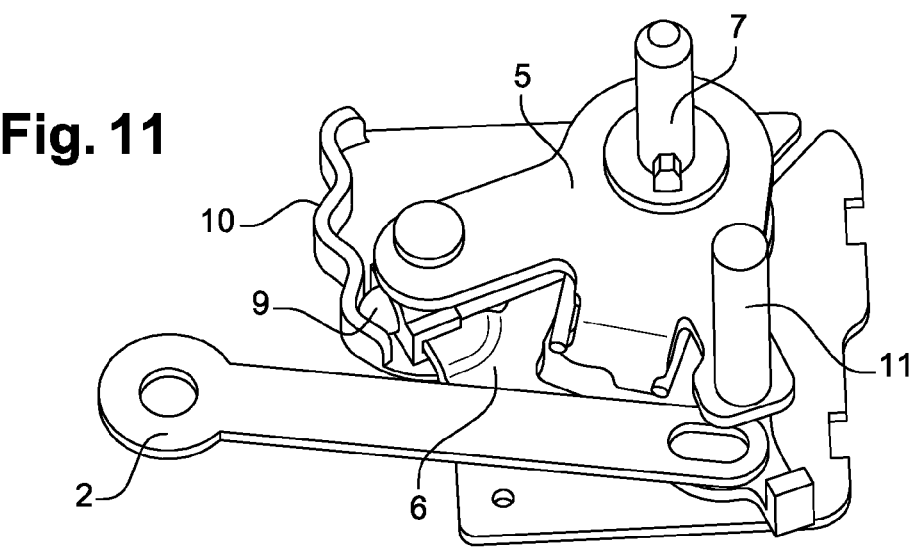
FIG. 11 shows the positioning of the levers according to the configuration illustrated in FIG. 10.

In FIGS. 10 and 11, the rod (3) is engaged in one of the notches of the toothed wheel; the levers (5) and (6) and the control system are in the positions stated previously for FIG. 9. As previously, when the actuator (12) is powered, the control system lever (6) is indexed in the reverse gear position. However, when the rod (3) is engaged in a notch of the wheel as specified, the locking pin (11) comes to bear against the carriage lever (5) when the power supply to the actuator (12) is coupled.

Figure 12:
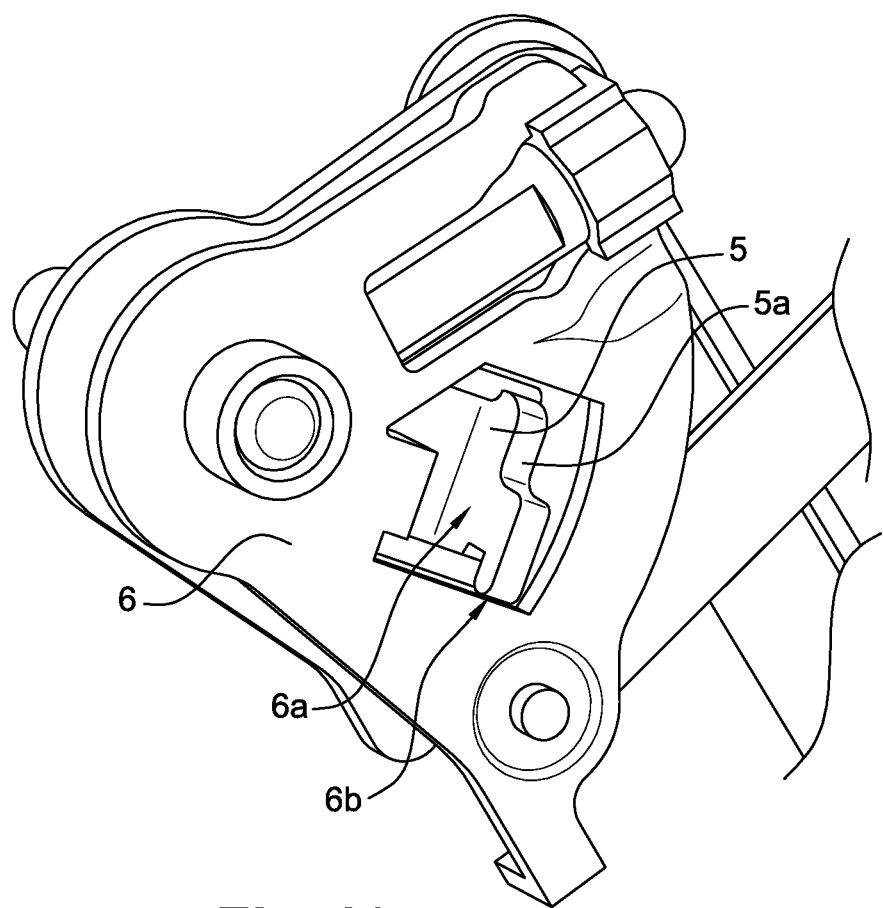
FIG. 12 is a partial view in perspective, showing the area of direct contact between the carriage lever and the control system lever.

As shown in FIG. 12, for the unlocking of the device in (P) position, the control system lever (6) is in direct contact with a part of the carriage lever (5). For this, the carriage lever (5) has a shoulder (5a) protruding from its base, that can be engaged in an opening (6a) in the control system lever (6), to create a direct-contact area (6b).

The advantages come to the fore clearly in the description.

The invention claimed is:

1. A device for locking a motor vehicle automatic gearbox in Park position comprising:
    a carriage acted-on by a control system controlled by a part of the gearbox, so as to be moved sideways in relation to a locking rod able to interoperate with a toothed crown built into said gearbox,
    two superimposed compact levers mounted so as to pivot on a pivot pin against a torsion spring mounted on the pivot pin,
    one of the levers being a carriage lever coupled to the carriage while the other lever is a control system lever coupled to the control system,
    the carriage lever cooperating with a locking pin operated by an actuator,
    the spring mounted on the pivot pin between the two levers to enable a simultaneous angular movement of said levers, or of one of the levers in relation to the other lever in a fixed position,
    the control system lever having an indexing finger able to interoperate, according to a selected position of the control system, with complementary shapes in a mounting plate in which said control system lever and carriage lever are mounted with pivoting capability, and
    when the control system and carriage levers are engaged in the park position, the locking rod is engaged in a notch of the toothed crown, the control system is in the reverse gear position, and the actuator is powered, the control system lever is indexed in the reverse gear position in the plate, and the carriage is brought forward onto the locking rod under the effect of movement of the carriage lever bearing against the locking pin when the actuator is powered down.

2. The device according to claim 1, characterized by the fact that the selected position of the control system is one of at least neutral point, fourth and reverse gear.

3. The device according to claim 1, characterized by the fact that, when the control system and carriage levers are positioned in neutral point position, the control system is in neutral point, fourth or reverse gear position, and the actuator is not powered; a clearance of a few millimeters occurs between the locking pin and the carriage lever.

4. The device according to claim 1, characterized by the fact that, when the control system and carriage levers are in fourth position, the control system is in fourth position, and the actuator is not powered, the carriage withdraws in relation to the locking rod, with the carriage lever being driven angularly directly by the control system lever, via the spring, with said levers and being indexed in fourth position in the mounting plate.

5. The device according to claim 1, characterized by the fact that, when the control system and carriage levers are in reverse gear position, the control system is in reverse gear position and the actuator is not powered, the carriage lever is blocked by the locking pin, while the control system lever is moved angularly against the spring, to be indexed in reverse gear position in the plate.

6. The device according to claim 1, characterized by the fact that, when the control system and carriage levers are in park position, the locking rod is not engaged in a notch of the toothed wheel, the control system is in reverse gear position and the actuator is powered, the spring absorbs the movement between the control system lever indexed in reverse gear position in the plate and the carriage lever bearing against the locking pin moved by said actuator.

7. The device according to claim 1, characterized by the fact that the carriage lever has a shoulder protruding from its base, that is engaged in an opening in the control system lever, to create an area of direct contact.

8. The device according to claim 1, characterized by the fact that the carriage lever has a shoulder protruding from its base, that is engaged in an opening in the control system lever, to create an area of direct contact.

9. A device for locking a motor vehicle automatic gearbox in Park position, incorporating a carriage acted-on by a control system controlled by a part of the gearbox, so as to be moved sideways in relation to a locking rod able to interoperate with a toothed crown built into said gearbox, with said carriage being coupled to a mechanism actuated by an actuator so as to be movable into a fixed position of the control system, characterized by the fact that
    the mechanism comprises two superimposed compact levers mounted so as to pivot on a pivot pin against a torsion spring mounted on said pivot pin, with one of the levers being a carriage lever coupled to the carriage while the other lever is a control system lever coupled to the control system,
    the control system lever has an indexing finger able to interoperate—according to a selected position of the control system—with complementary shapes in a mounting plate, in which said control system lever and the carriage lever are mounted with pivoting capability, and
    when the control system and carriage levers are engaged in the park position, the locking rod is engaged in a notch of the toothed crown, the control system is in the reverse gear position, and the actuator is powered, the control system levers is indexed in the reverse gear position in the plate, and the carriage is brought forward onto the locking rod under the effect of movement of the carriage lever bearing against the locking pin when the actuator is powered down.

10. The device according to claim 9, characterized by the fact that the spring is mounted on the pivot pin between the two levers to enable a simultaneous angular movement of said levers, or of one of the levers in relation to the other lever in a fixed position.

11. The device according to claim 9, characterized by the fact that the carriage lever interoperates with a locking pin operated by the actuator.

12. The device according to claim 9, characterized by the fact that the selected position of the control system is one of at least neutral point, fourth and reverse gear.

13. The device according to claim 9, characterized by the fact that, when the control system and carriage levers are positioned in neutral point position, the control system is in neutral point, fourth, or reverse gear position, and the actuator is not powered, a clearance of a few millimeters occurs between the locking pin and the carriage lever.

14. The device according to claim 9, characterized by the fact that, when the control system and carriage levers are in fourth position, the control system is in fourth position, and the actuator is not powered, the carriage withdraws in relation to the locking rod, with the carriage lever being driven angularly directly by the control system lever, via the spring, with said levers and being indexed in fourth position in the mounting plate.

15. The device according to claim 9, characterized by the fact that, when the control system and carriage levers are in reverse gear position, the control system is in reverse gear position and the actuator is not powered, the carriage lever is blocked by the locking pin, while the control system lever is moved angularly against the spring, to be indexed in reverse gear position in the plate.

16. The device according to claim 9, characterized by the fact that, when the control system and carriage levers are in park position, the locking rod is not engaged in a notch of the toothed wheel, the control system is in reverse gear position and the actuator is powered, the spring absorbs the movement between the control system lever indexed in reverse gear position in the plate and the carriage lever bearing against the locking pin moved by said actuator.

* * * * *